United States Patent [19]
Chen

[11] Patent Number: 5,645,233
[45] Date of Patent: Jul. 8, 1997

[54] APPARATUS FOR RECYCLING SCRAPPED POLYLON

[76] Inventor: I-Chung Chen, 2nd Floor, 146 Yan-chi Street, Tu Chan City, Taipei Hsien, Taiwan

[21] Appl. No.: 625,260

[22] Filed: Apr. 2, 1996

[51] Int. Cl.$^6$ .............................. B02C 18/40; B02C 19/12
[52] U.S. Cl. .............................. 241/65; 241/100; 241/159
[58] Field of Search .............................. 241/65, 79.1, 100, 241/159, 606

[56] References Cited

U.S. PATENT DOCUMENTS

| | | | |
|---|---|---|---|
| 4,984,748 | 1/1991 | Kimura | 241/65 |
| 5,046,669 | 9/1991 | Wallace et al. | 241/23 |
| 5,089,228 | 2/1992 | Meijer | 241/606 X |
| 5,166,488 | 11/1992 | Peppard | 241/65 X |
| 5,186,400 | 2/1993 | Ignjatovic et al. | 241/39 |
| 5,209,411 | 5/1993 | Dineley et al. | 241/17 |
| 5,362,443 | 11/1994 | Tanaka et al. | 241/606 X |
| 5,447,685 | 9/1995 | Sievert et al. | 241/606 X |
| 5,566,894 | 10/1996 | Karch | 241/29 |
| 5,570,845 | 11/1996 | Lewis et al. | 241/21 |

*Primary Examiner*—John M. Husar
*Attorney, Agent, or Firm*—Bacon & Thomas

[57] ABSTRACT

Disclosed is an apparatus for recycling scrapped POLYLON which mainly includes a scrap crashing and feeding unit, a scrap melting unit and a waste gas treatment unit. The scrap crashing and feeding unit includes a top, a left, and a right rollers with toothed cutter to break the scraps into smaller pieces which are pushed onto a feeding roller located below the above three rollers and having spiral grooves to automatically carry and feed the small scrap pieces into the melting unit. The scrap melting unit has a plurality of rod-shaped electric heaters wrapped with thermo-conductive material and squarely arranged in a furnace around the feeding roller to evenly heat the furnace and quickly melt the scrapped POLYLON pieces. The waste gas treatment unit filters waste gas produced by the melting unit and is sequentially divided into an inner filter segment containing industrial wool and active carbon, a cooling segment with condenser pipes, a spraying segment providing water spray to cool the waste gas, an industrial wool segment, and an active carbon segment, so that the waste gas is deodored and purified to become refresh and clean air again before it is discharged to the open air.

7 Claims, 6 Drawing Sheets

APPARATUS FOR RECYCLING SCRAPPED POLYLON

BACKGROUND OF THE INVENTION

An example of the conventional apparatus for recycling scrapped POLYLON is disclosed in Taiwanese Patent Pub. No. 197976 titled "An apparatus for recycling scrapped POLYLON and the operation method thereof". The apparatus disclosed by the above-mentioned Taiwanese Patent is characterized in a furnace having a door with a cover which, when being closed to the door, allows the furnace to define a completely sealed space, a heating pipe system disposed inside the furnace on a bottom thereof, heat medium disposed between the heating pipe system and an inner wall of the furnace for evenly distributing the heat generated from the heating pipe system to the inner wall of the furnace, a collecting container disposed below the furnace to collect the molten POLYLON scraps, a control panel for maintaining the in-furnace temperature at a fixed level, and a chimney with filter screen for exhausting gas produced during the recycling process with minimized air pollution.

The apparatus disclosed in Taiwanese Patent Pub. No. 197976 has the following disadvantages when it is empolyed to recycle the scrapped POLYLON:

1. The pieces of scrapped POLYLON are different in their shape and size and they are usually dumped into the furnace without being sorted based on their shape or size. This causes many gaps existed between the scrap pieces in the furnace and prevents the pieces from closely contacting with one another when being heated. Although the heating pipe system is disposed on a bottom of the furnace and the heat produced by the heating pipe system can be evenly distributed via the heat medium to the inner wall of the furnace, the unsorted and disarrayed POLYLON scraps with only small contact area between one another often prevent the heat from evenly conducting and the scraps from absorbing sufficient heat to melt completely. Therefore, prolonged time of heating is required to thoroughly melt the scrapped POLYLON pieces. This is, of course, an unnecessary waste of heat. In addition, the reduced thermal efficiency increases the produced waste gas. All of these do not meet the requirements of economical benefits and actual needs.

2. To enable complete melting of scrapped POLYLON pieces and reduced heating time, the scraps must be sorted before they are dumped into the furnace for melting. However, it is another labor and time consuming work to sort the scraps and will do little help to the previously disclosed apparatus when viewing from the economical point.

3. It is a must to keep the entire recycling process (from the melting of scraps to the filtering and exhausting of wasted gas) in continuous steps and in a completely sealed space, so as to ensure the harmlessness of the exhausted gas. However, in the apparatus disclosed in Taiwanese Patent Pub. No. 197976, the cover of the door of the furnace must be opened to dump the subsequent scraps into the furnace for melting. And, the waste gas inside the furnace will quickly escape from the furnace as soon as the door thereof is opened. This forms a drawback in the required continuous and sealed recycling process. In addition, such waste gas is usually hazardous to the health of operators and the public sanitation due to the air pollution it causes.

It is therefore desirable to develop an improved apparatus for recycling scrapped polylon on which not only melts the scrapped POLYLON but also effectively achieves the waste gas pollution control to eliminate the disadvantages existed in the conventional apparatus.

SUMMARY OF THE INVENTION

A primary object of the present invention is to provide an apparatus for recycling scrapped POLYLON on in which a scrap crashing and feeding unit with toothed cutters, push boards and a spiral conveyor is used to break the POLYLON scraps into small pieces and then send the pieces to another unit for melting.

Another object of the present invention is to provide an apparatus for recycling scrapped POLYLON in which a scrap melting unit with electric heaters disposed in a melting furnace is used, so that scraps fed into the scrap melting furnace is directly and more quickly heated and the scraps are molten by the heat produced by the electric heaters at higher thermal efficiency with reduced heat energy and electric power consumption.

A further object of the present invention is to provide an apparatus for recycling scrapped POLYLON in which a waste gas treatment unit is used to filter the waste gas produced during the recycling process. The waste gas is guided into the unit to pass filter segments and is subjected to cooling and water sprays. Moreover, filters, such as industrial wool and active carbon, are repeatedly used to remove impurities and bad odor from the waste gas to make the same fresh and clean air again to meet the requirements of environmental protection.

BRIEF DESCRIPTION OF THE DRAWINGS

The above and other objects of the present invention, as well as the technical means adopted by the present invention to achieve the functions and features thereof can be best understood through the following description of the preferred embodiments and the accompanying drawings, wherein.

DETAILED DESCRIPTION OF THE PREFERRED EMBODIMENTS

Figure 1:
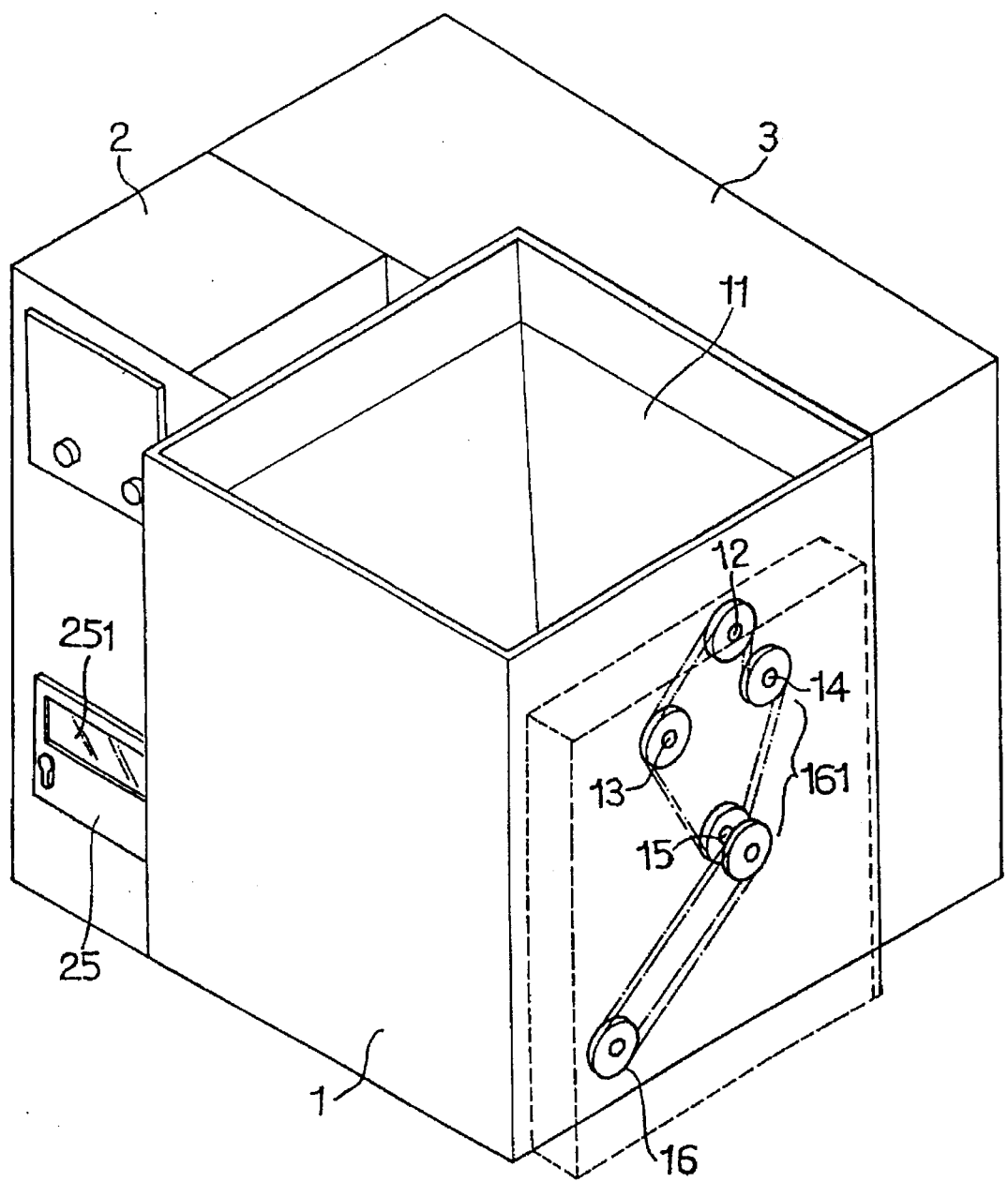
FIG. 1 is a perspective showing the present invention.

Please refer to FIG. 1. The present invention relates to an apparatus for recycling scrapped POLYLON and mainly includes a scrap crashing and feeding unit 1, a scrap melting unit 2, and a waste gas treatment unit 3.

Figure 4:
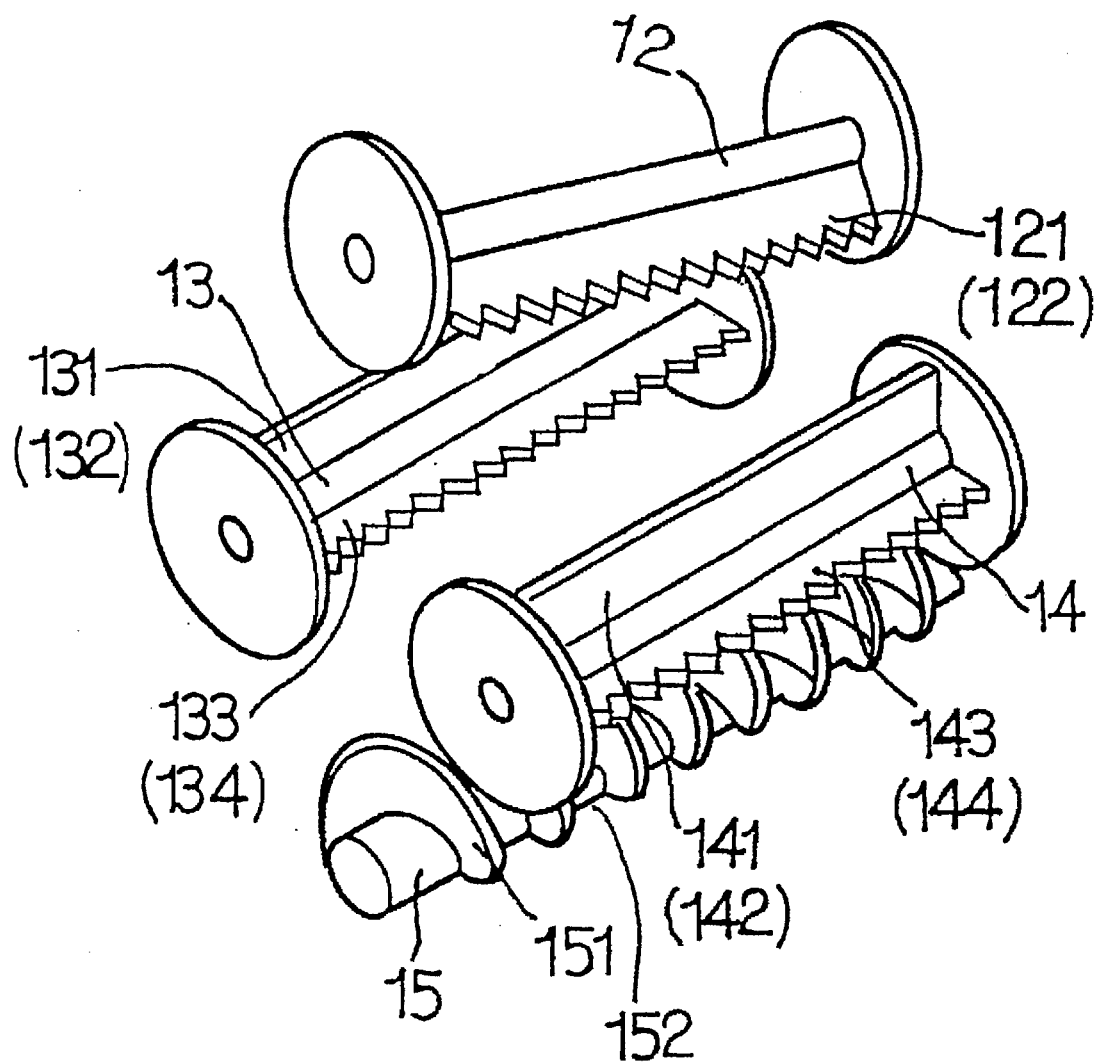
FIG. 4 is a perspective showing the rolls with toothed cutters and push boards of the scrap crashing and feeding unit.

Please refer to FIGS. 1, 2, 3 and 4 at the same time, the scrap crashing and feeding unit 1 includes a housing in which a hopper 11 is disposed at an upper portion of the housing to receive and accommodate scraps dumped thereinto. The hopper 11 is provided at a lower portion thereof with a top roller 12, and a left and a right rollers 13, 14 disposed below the top roller 12. As shown in FIG. 4, the top roller 12 is inclinedly and angularly disposed relative to the left and the right rollers 13, 14, so that scraps in big size can be dumped into the hopper without difficulty. The top roller 12 is provided at a shaft thereof with two laterally symmetrically positioned toothed cutters 121, 122. The left and the right rollers 13, 14 are provided at a respective shaft thereof with two diametrically opposite scrap push boards 131, 132 and 141, 142, and two diametrically opposite toothed cutters 133, 134 and 143, 144 normal to the two scrap push boards 131, 132 and 141, 142, respectively. A feeding roller 15 with spiral blade 151 for guiding and feeding crashed scraps is disposed below and between the left and the right rollers 13, 14. All the rollers 12, 13, 14 and 15 are provided at their respective outer end with a driven wheel 161 to remotely connect to a transmission mechanism 16 disposed at a lower portion of the housing.

Figure 2:
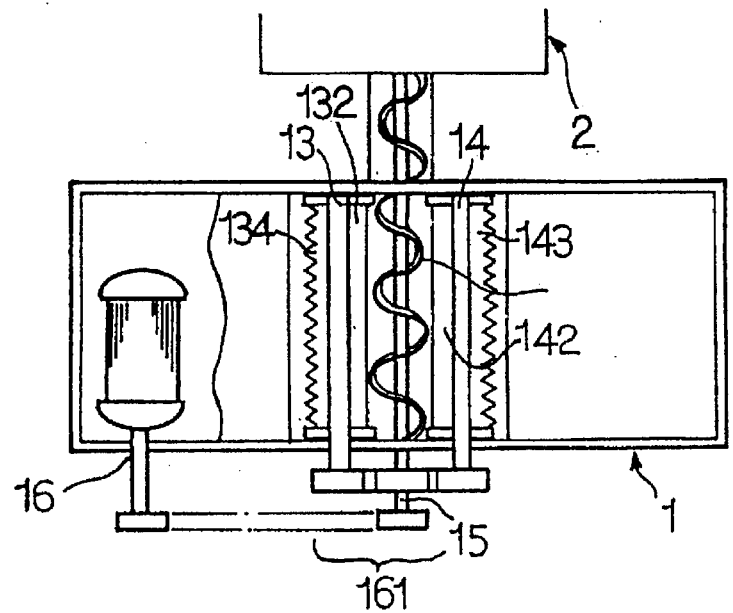
FIG. 2 is a top view showing the scrap crashing and feeding unit of the present invention.
Figure 3:
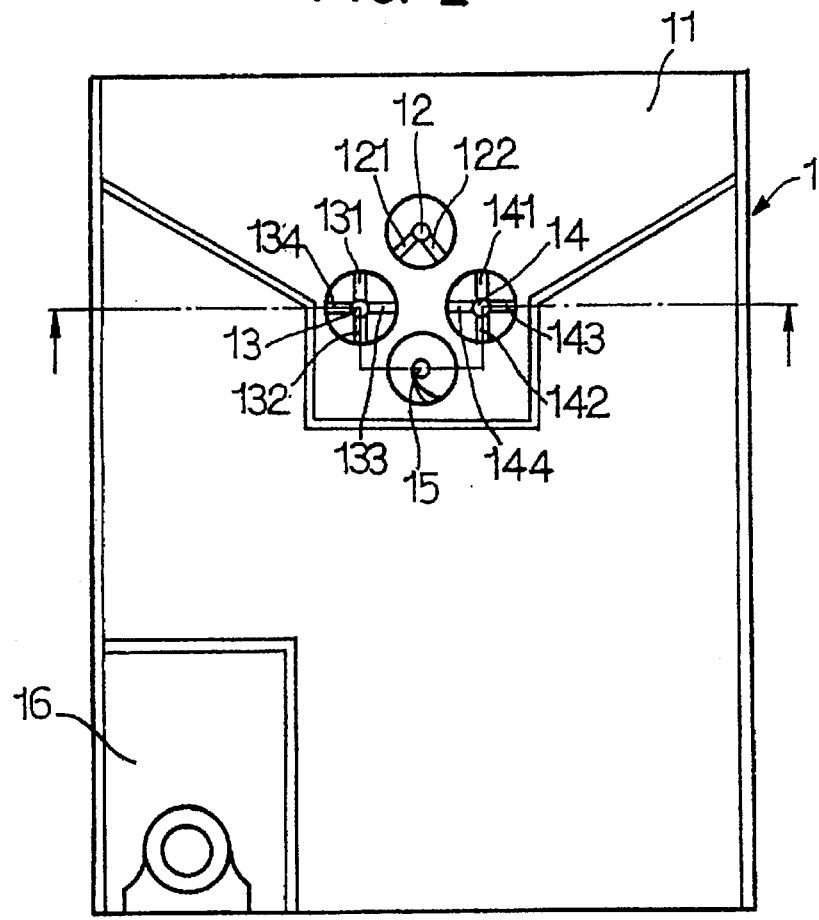
FIG. 3 is is a front elevational view of the scrap crashing and feeding unit of the present invention.
Figure 5:
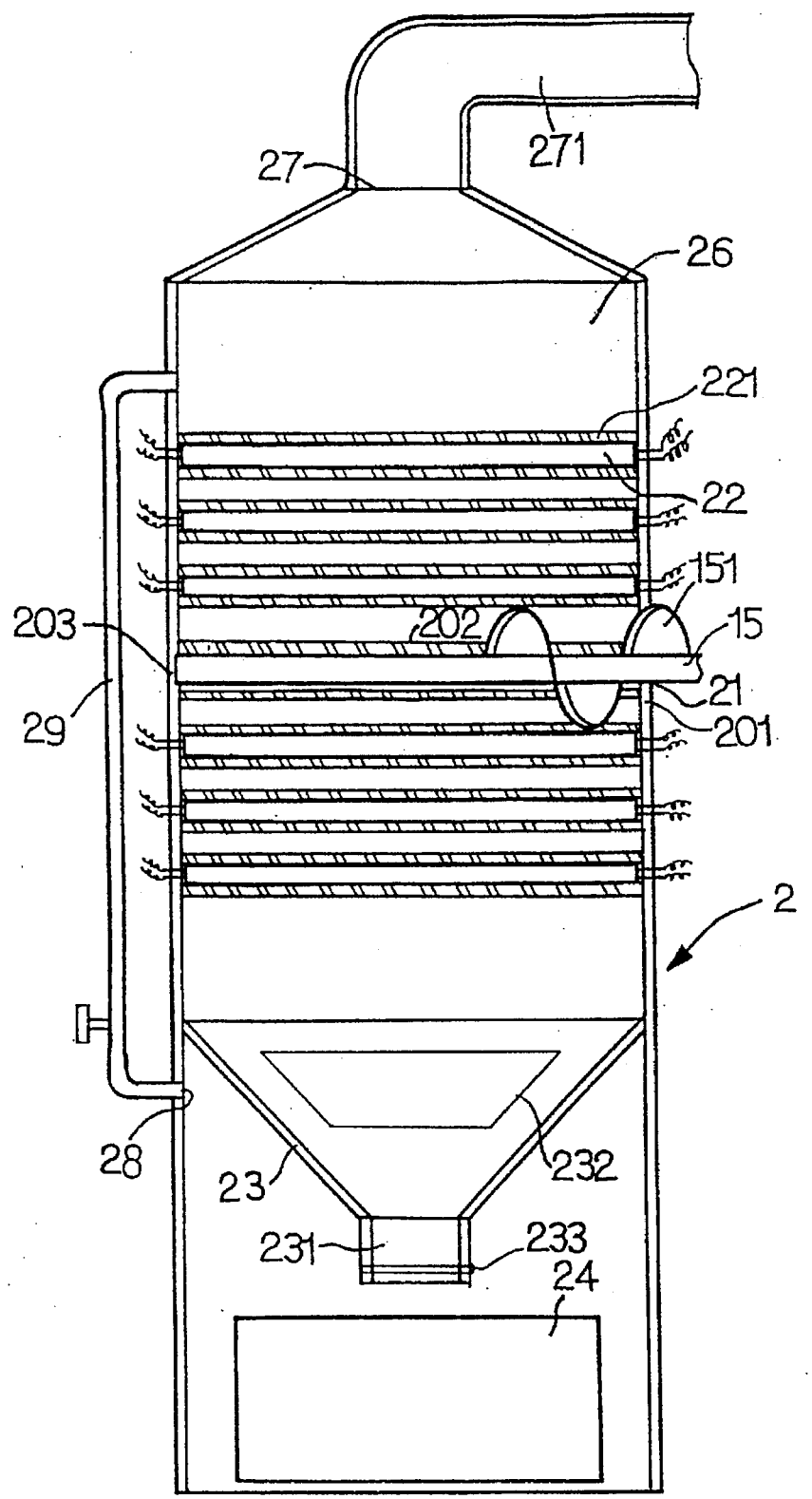
FIG. 5 is a front sectional view of the scrap melting unit of the present invention.
Figure 6:
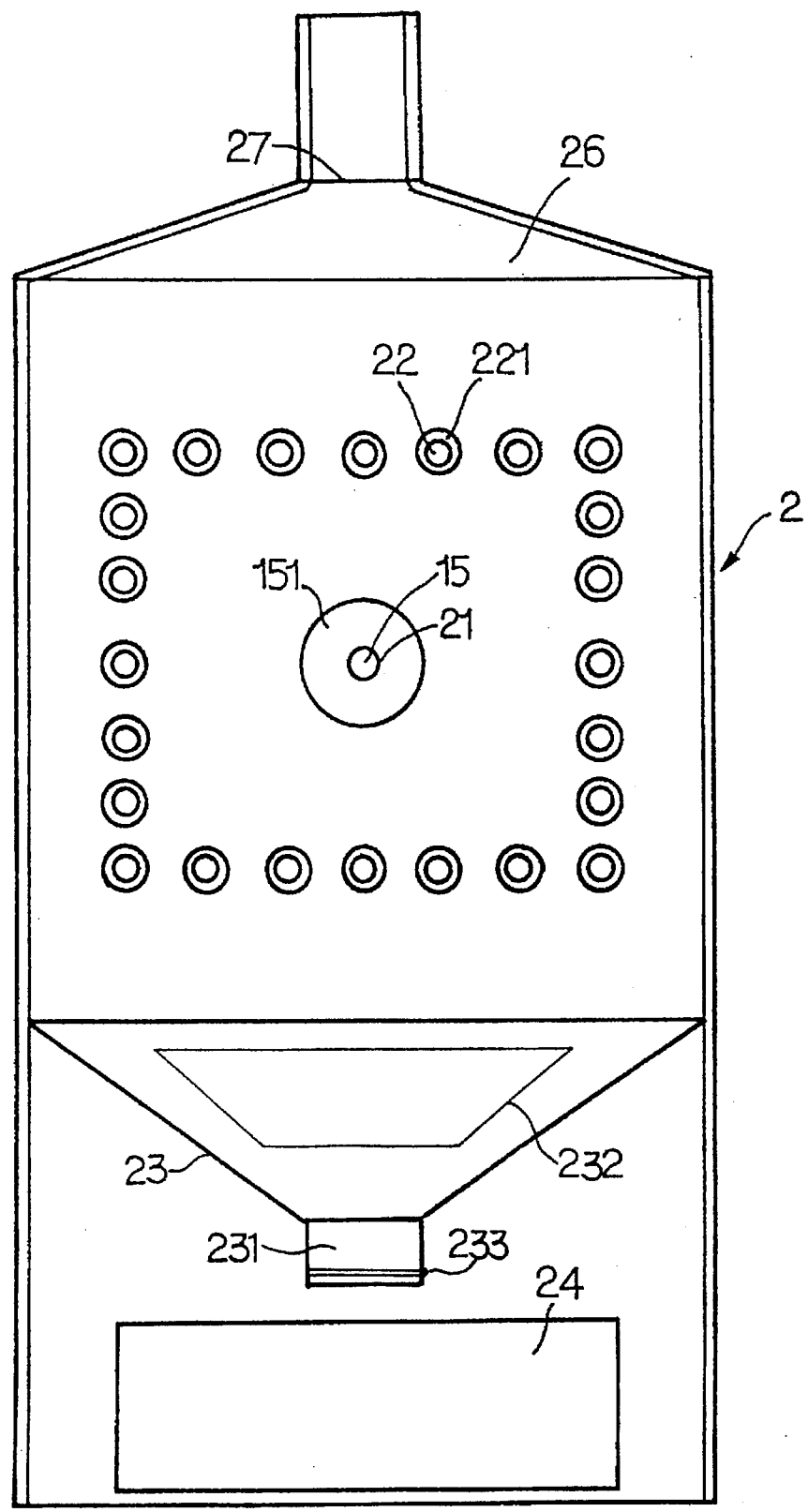
FIG. 6 is a side elevational view of the scrap melting unit of the present invention.

Please refer to FIGS. 5 and 6 at the same time. The scrap melting unit 2 is located to one side of the scrap crashing and feeding unit 1 and includes a furnace 20. The furnace 20 has a feeding opening 21 formed at a middle portion of a first wall 201 thereof, to receive the scrap feeding roller 15 of the scrap crashing and feeding unit 1. It is to be noted that, as shown in FIG. 2, a space is left between the scrap crashing and feeding unit 1 and the scrap melting unit 2 interconnected via the feeding roller 15, so that any waste gas produced during a melting process in the scrap melting unit 2 is prevented from flowing back into said unit 1. A plurality of rod-shaped electric heaters 22 wrapped with thermo-conductive material 221 are squarely disposed in the furnace around the feeding opening 21 to extend in a direction the same as that of the feeding roller 15 and across a central portion 202 of the furnace to connect to a second wall 203 of the furnace opposite to the first wall 201.

Inward and downward inclinedly extended liquid collecting boards 23 are disposed in the furnace at a lower portion. Furthermore, electric heating plates 232 are provided to a top portion of the liquid collecting boards 23 to heat the boards 23 so as to fully melt unmolten scraps contained in the molten liquid of polylon. Via the liquid collecting boards 23, the liquid molten scraps of POLYLON can smoothly flow down into a container 24 disposed below the liquid collecting boards 23. The inclined liquid collecting boards 23 together form a centered outlet 231 at their lower ends. Via the outlet 231, the molten scrap is discharged to the container 24. A control valve 233 is provided to a lower end of the outlet 231 to control and/or stop the amount of molten scrap discharged via the outlet 231. As shown in FIG. 1, a manually operated door with an observation window 251 is provided to one side of the unit 2 near a lower portion thereof. A waste gas chamber 26 is formed atop the furnace 20 with a top gas outlet 27. A gas conduit 271 is connected at one end to the top gas outlet 27 and at the other end to the gas waste treatment unit 3. A small side gas outlet 28 is formed on the furnace wall 203 slightly below the liquid collecting boards 23. A pipe 29 extends between the side gas outlet 28 and the waste gas chamber 26.

Figure 7:
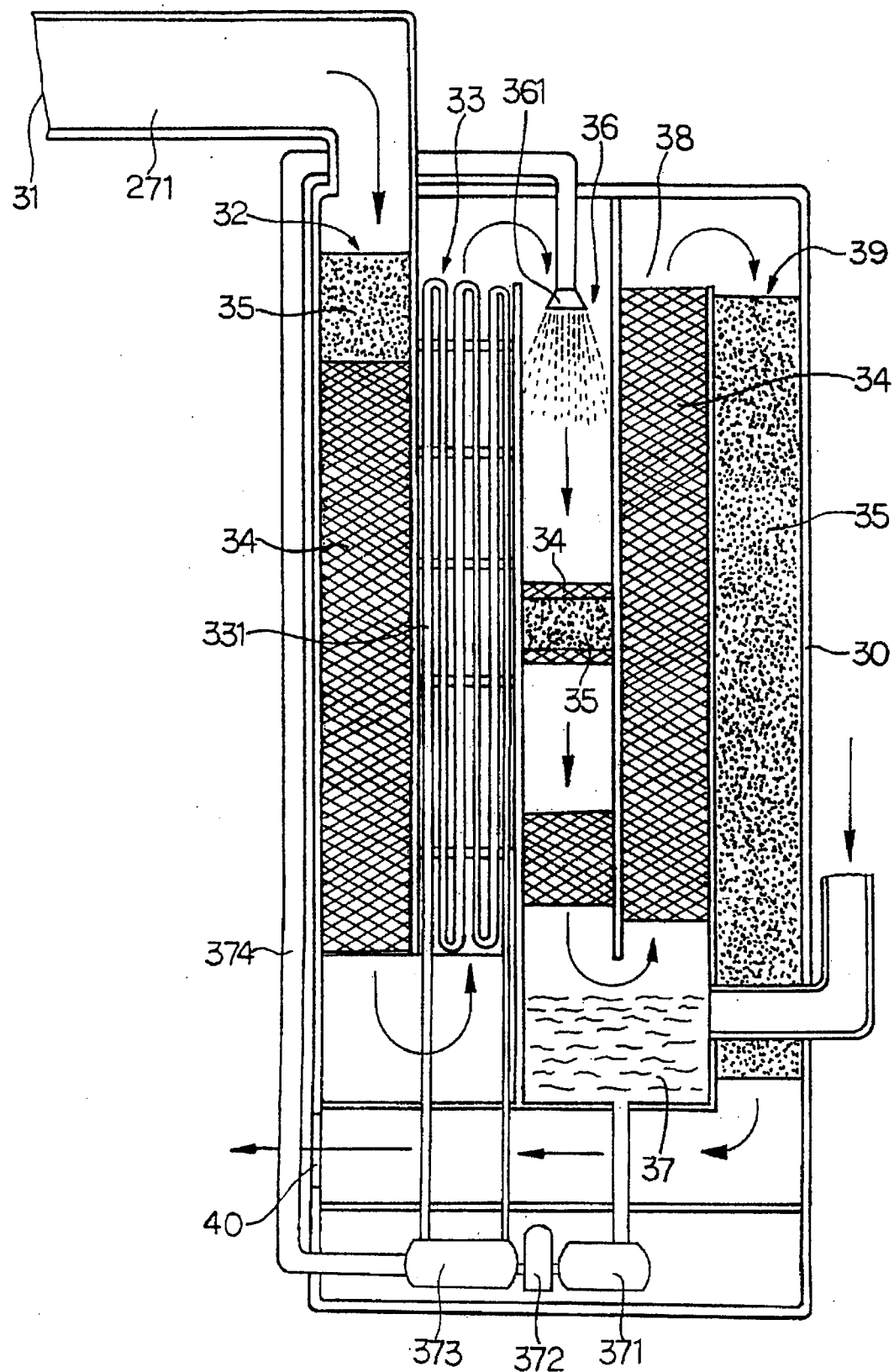
FIG. 7 is a sectional view showing the waste gas treatment unit of the present invention.

Please refer to FIGS. 1 and 7. The waste gas treatment unit 3 is located to one side of the scrap crashing and feeding unit 1 and the scrap melting unit 2. The unit 3 includes a generally L-shaped housing 30 having a gas inlet 31 provided at a top portion thereof to connect with the gas conduit 271 extended from the unit 2. An inner filter segment 32 containing industrial wool 34 and active carbon 35 is provided to an end of the conduit 271 connected to the gas inlet 31. The gas conduit 271 further turns about to extend upward and includes a cooling segment 33 including a plurality of condensr pipes 331 to lower the temperature of the waste gas passing therethrough. The gas conduit 271 turns about again to extend downward forming a spraying segment 36. A sprayer 361 connected to a water pipe 374 is provided to a top of the spraying segment 36 so that water is sprayed onto a layer of industrial wool 34 and active carbon 35 disposed in a middle portion of the spraying segment 36. The gas conduit 271 turns about at a lower end to extend upward again, forming another industrial wool filter segment 38, and turns again to extend downward, forming another active carbon filter segment 39. A water reservoir 37 is provided below the lower end of the spraying segment 36 and the industrial wool segment 38. A water pump 371, a filter 372, a compressor 373 are connected in series to the water pipe 374 which extends from a bottom of the water reservoir 37 to the top of the spraying segment 36 to connect the sprayer 361 thereto. This allows the sprayed water to be circulated and reused repeatedly. Waste gas passing through the segments 38 and 39 is deodored and purified to a quality meeting the environmental protection requirement and finally escapes from the unit 3 via a gas outlet 40 provided at a lower portion of the housing 30. An exhaust fan may be optionally connected to the gas outlet 40.

To use the apparatus for recycling scrapped POLYLON of the present invention, first start the transmission mechanism 16 of the scrap crashing and feeding unit 1 so that the driven wheels 161 connected to the outer ends of the top, the left and the right rollers 12, 13, 14 and the feeding roller 15 are brought to rotate. Then, scraps of POLYLON are dumped into the hopper 11 of the unit 1 to be crashed and broken into small pieces in somewhat similar dimensions by the toothed cutters 121, 122; 133, 134; and 143, 144 of the top, the left and the right rollers 12, 13, and 14, respectively. The crashed pieces are then pushed by the push boards 131, 132 and 141, 142 of the roller 13, 14, respectively, onto spiral guiding grooves 152 formed on the spiral blade 151 of the feeding roller 15. Following the rotating roller 15, the crashed pieces on the spiral grooves 152 are conveyed to the scrap melting unit 2 via the feeding opening 21. Thereby, the time required by the conventional apparatus to sort the scraps in different sizes is saved and the scraps can be automatically delivered to the next melting process.

The crashed scrap pieces are filled in the central portion 202 of the furnace 20. Due to the rod-shaped electric heaters 22 wrapped with thermo-conductive material 221 are squarely arranged around and extended across the central portion 202, the central portion 202 is evenly heated from all four sides thereof. And, since the crashed scrap pieces each has very small volume, they can be easily and quickly molten by absorbing only very little amount of heat. The heat directly transmitted from the heaters 22 inside the furnace 20 to the scraps enables higher thermal efficiency than the conventional apparatus with heating pipes in the furnace walls.

When the scraps are molten by the electric heaters 22, the produced liquid drips down from gaps between the electric heaters 22 onto the liquid collecting boards 23, and further flows along the boards 23 to the centered outlet 231. Any unmolten pieces contained in the liquid can be further heated to melt by the heated electric heating plates 232 disposed on the boards 23. All the molten liquid polylon is then guided into the container 24 positioned below the liquid collecting boards 23. The level of liquid in the container 24 can be observed from the window 251 of the manually operated door 25. When the liquid in the container 24 reaches a high level, the control valve 233 provided at the lower end of the centered outlet 231 can be closed and the container 24 can be removed from the door 25 and another empty container 24 can be replaced in the unit 2 to continue the melting process. The liquid POLYLON can be reused after it is cooled and set.

The waste gas produced during the melting process is discharged from the furnace 20 via the top gas outlet 27 above the waste gas chamber 26 on the top portion of the furnace 20. A part of waste gas existed in a space below the liquid collecting boards 23 is discharged from the side gas outlet 28 and is guided to the waste gas chamber 26 through the pipe 29. The waste gas in the chamber 26 is guided by the gas conduit 271 into the waste gas treatment unit 3 via the gas inlet 31 for filtering process.

The waste gas first passes through the inner filter segment 32 containing industrial wool 34 and active carbon 35, then the cooling segment 33 to be cooled by the condenser tubes 331. When the waste gas passes through the spraying segment 36, water is sprayed onto the industrial wool 34 and active carbon 35 contained in the spraying segment 36 to achieve better filtering effect. The gas then passes through the industrial wool filter segment 38 and the active carbon filter segment 39 at where the bad odor and impurities remaining in the waste gas are completely removed. When the gas reaches and is discharged from the gas outlet 40, it is already clean and fresh air again meeting the environmental protection requirements.

What is to be noted is all the crashing, feeding and melting of the scraps, as well as the filtering of the produced waste gas are continuously proceeded in a completely closed space without the risk of leaking out any heat or untreated waste gas from the apparatus into the surrounding working environment. This meets, of course, the requirements of environmental protection concerning the waste gas treatment and is harmless to the health of the operators as well as the public sanitation.

It is to be understood that the form of the invention shown and disclosed by the specification and the accompanying drawings is to be taken as a preferred embodiment of the invention and not intended to limit the present invention, and that various changes in the shape, size, and arrangement of parts may be resorted to without departing from the spirit of the invention or the scope of the subjoined claims.

What is claimed is:

1. An apparatus for recycling scrapped POLYLON, comprising a scrap crashing and feeding unit, a scrap melting unit for electrically heating and melting said scrapped POLYLON, and a waste gas treatment unit for filtering waste gas produced during melting process in said melting unit; said scrap crashing and feeding unit further comprising a housing in which a hopper is disposed at an upper portion thereof to receive and accommodate said scraps dumped thereinto, said hopper being provided at a lower portion thereof with a top roller, and a left and a right rollers disposed below said top roller, said top roller being provided on a shaft thereof with two laterally symmetrically positioned cutters, and said left and said right rollers being provided on a respective shaft thereof with two diametrically opposite scrap push boards and two diametrically opposite cutters normal to said two scrap push boards, said cutters on said top and said left and right rollers being used to crash and break said scrapped POLYLON dumped into said hopper to smaller pieces and said scrap push boards being used to push said crashed and broken smaller pieces of scrapped POLYLON onto a feeding roller extended into said melting unit, said feeding roller being disposed below and between said left and said right rollers and having a spiral blade formed to axially extend along a shaft thereof, said spiral blade providing spiral grooves on said feeding roller to receive said crashed scrap pieces from said top, said left and said right rollers, so that said crashed scrap pieces are automatically guided and fed into said scrap melting unit when said feeding roller is rotated.

2. An apparatus for recycling scrapped POLYLON as claimed in claim 1, wherein said top roller is inclinedly and angularly disposed relative to said left and said right rollers, and said cutters on said top, said left and said right rollers all are formed with toothed edges.

3. An apparatus for recycling scrapped POLYLON as claimed in claim 1, wherein said scrap melting unit is located to one side of said scrap crashing and feeding unit and includes a furnace, said furnace having a feeding opening formed at a middle portion of a first wall thereof to receive said scrap feeding roller of said scrap crashing and feeding unit, and a plurality of rod-shaped electric heaters wrapped with thermo-conductive material and squarely disposed in said furnace around said feeding opening to extend in a direction the same as that of said feeding roller and across a central portion of said furnace to connect to a second wall of said furnace opposite to said first wall.

4. An apparatus for recycling scrapped POLYLON as claimed in claim 1 or 3, wherein said furnace of said scrap melting unit is provided at a lower portion with inward and downward inclined liquid collecting boards and electrical heating plates disposed on said liquid collecting boards for collecting molten liquid of said scrapped POLYLON produced by said electric heaters in said furnace, said liquid collecting boards together forming a lower and centered outlet, at a lower end of which a control valve being provided to control the open and close of said centered outlet and the volume of said molten liquid of scraps flowing through said centered outlet into a container disposed below said outlet; and said scrap melting unit further having a manually operated door with an observation window through which the level of said liquid in said container can be observed and said container can be removed out of said scrap melting unit from said door when it is full.

5. An apparatus for recycling scrapped POLYLON as claimed in claim 1 or 3, wherein said furnace of said scrap melting unit is provided at a top portion with a waste gas chamber to collect waste gas produced during said melting process in said furnace of said scrap melting unit, a top gas outlet being formed at a top of said waste gas chamber, a side gas outlet being formed on a furnace wall slightly below said liquid collecting boards, and a gas pipe being connected between said side gas outlet and said waste gas chamber.

6. An apparatus for recycling scrapped POLYLON as claimed in claim 1 or 3, wherein said waste gas treatment unit being located to one side of said scrap crashing and feeding unit and said scrap melting unit and has a generally L-shaped housing, said housing having a gas inlet provided at a top portion thereof to connect with a gas conduit extended from said waste gas chamber of said scrap melting unit, and being sequentially divided into an inner filter segment containing industrial wool and active carbon, a cooling segment with a plurality of condenser pipes for lowering the temperature of said waste gas passing therethrough, a spraying segment having a sprayer connected to a water pipe provided to a top thereof so that water is sprayed while said waste gas passes through a layer of industrial wool and active carbon disposed in a middle portion of said spraying segment, an industrial wool filter segment, and an active carbon filter segment, such that said waste gas is discharged from a gas outlet provided at a lower portion of said housing after it has passed all of said filtering segments; and an external exhaust fan being optionally connected to said gas outlet to enhance the exhausting of said filtered waste gas out of said waste gas treatment unit.

7. An apparatus for recycling scrapped POLYLON as claimed in claim 1 or 3, wherein said waste gas treatment unit is provided on a top of said spraying segment with a sprayer and a bottom thereof with a water reservoir; a water pump, a filter, and a compressor being connected to a water pipe which is connected at one end to said water reservoir and at the other end to said sprayer, whereby said water for spraying said industrial wool and said active carbon can be circulated for reuse.

* * * * *